(12) United States Patent
Lee et al.

(10) Patent No.: US 10,563,978 B2
(45) Date of Patent: Feb. 18, 2020

(54) APPARATUS AND METHOD FOR MEASURING A THREE DIMENSIONAL SHAPE

(71) Applicant: KOH YOUNG TECHNOLOGY INC., Seoul (KR)

(72) Inventors: Seung-Jun Lee, Seoul (KR); Kwangill Koh, Seoul (KR); Moon-Young Jeon, Seoul (KR); Sang-Kyu Yun, Chungju-si (KR); Hong-Min Kim, Seoul (KR); Jung Hur, Bucheon-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 0 days.

(21) Appl. No.: 15/929,142

(22) Filed: Jun. 12, 2019

(65) Prior Publication Data

US 2019/0293413 A1 Sep. 26, 2019

Related U.S. Application Data

(60) Continuation of application No. 15/331,499, filed on Oct. 21, 2016, now Pat. No. 10,359,276, which is a
(Continued)

(30) Foreign Application Priority Data

| Feb. 26, 2008 | (KR) | 10-2008-0017439 |
| Aug. 23, 2008 | (KR) | 10-2008-0082629 |
| Feb. 25, 2009 | (KR) | 10-2009-0015691 |

(51) Int. Cl.
 *G01B 11/25* (2006.01)
 *G01B 11/245* (2006.01)
(Continued)

(52) U.S. Cl.
 CPC ........ *G01B 11/2513* (2013.01); *G01B 11/245* (2013.01); *H04N 5/247* (2013.01); *G02B 27/40* (2013.01)

(58) Field of Classification Search
 CPC .................................................. G01B 11/2513
 (Continued)

(56) References Cited

U.S. PATENT DOCUMENTS

| 5,039,868 A | 8/1991 | Kobayashi et al. |
| 5,060,065 A | 10/1991 | Wasserman |

(Continued)

FOREIGN PATENT DOCUMENTS

| CN | 1437000 | 8/2003 |
| CN | 1587900 A | 3/2005 |

(Continued)

OTHER PUBLICATIONS

Hu, Q., et al., "Multiple Views Merging from Different Cameras in Fringe-Projection Based Phase-Shifting Method", Proc. of SPIE, vol. 6762, 2007, pp. 676207-1-676207-8.

*Primary Examiner* — Yulin Sun
(74) *Attorney, Agent, or Firm* — Oblon, McClelland, Maier & Neustadt, L.L.P.

(57) ABSTRACT

Provided are an apparatus and a method for measuring a three dimensional shape with improved accuracy. The apparatus includes a stage, at least one lighting unit, a plurality of image pickup units and a control unit. The stage supports an object to be measured. The lighting unit includes a light source and a grid, and radiates grid-patterned light to the object to be measured. The image pickup units capture, in different directions, grid images reflected from the object to be measured. The control unit calculates a three dimensional shape of the object from the grid images captured by the image pickup units. The present invention has advantages in
(Continued)

capturing grid images through a main image pickup portion and sub-image pickup portions, enabling the measurement of the three dimensional shape of the object in a rapid and accurate manner.

20 Claims, 14 Drawing Sheets

Related U.S. Application Data continuation of application No. 14/463,269, filed on Aug. 19, 2014, now Pat. No. 9,488,472, which is a division of application No. 12/919,691, filed as application No. PCT/KR2009/000904 on Feb. 25, 2009, now Pat. No. 8,854,610.

(51) Int. Cl.
*H04N 5/247* (2006.01)
*G02B 27/40* (2006.01)

(58) Field of Classification Search
USPC .......................................................... 348/136
See application file for complete search history.

(56) References Cited

U.S. PATENT DOCUMENTS

| | | | |
|---|---|---|---|
| 5,064,291 A | 11/1991 | Reiser | |
| 5,175,601 A | 12/1992 | Fitts | |
| 5,202,749 A | 4/1993 | Pfister | |
| 5,307,151 A | 4/1994 | Hof et al. | |
| 5,686,994 A | 11/1997 | Tokura | |
| 5,785,651 A | 7/1998 | Kuhn et al. | |
| 6,084,663 A | 7/2000 | Seng | |
| 6,339,471 B1* | 1/2002 | Morita | G03F 9/7069 356/401 |
| 6,522,777 B1 | 2/2003 | Paulsen et al. | |
| 6,554,452 B1 | 4/2003 | Bourn et al. | |
| 6,664,531 B2 | 12/2003 | Gartner et al. | |
| 6,750,975 B2 | 6/2004 | Takeda et al. | |
| 7,019,848 B2 | 3/2006 | Mamiya | |
| 7,599,076 B2 | 10/2009 | Saito et al. | |
| 2001/0053200 A1 | 12/2001 | Hori | |
| 2004/0089059 A1 | 5/2004 | Watanabe et al. | |
| 2004/0252312 A1* | 12/2004 | Chen | G16H 20/40 356/603 |
| 2005/0157920 A1 | 7/2005 | Doherty et al. | |
| 2005/0200857 A1 | 9/2005 | Christ, Jr. et al. | |
| 2006/0158664 A1 | 7/2006 | Koh et al. | |
| 2007/0120977 A1 | 5/2007 | Duquette et al. | |
| 2007/0211259 A1 | 9/2007 | Jeon et al. | |
| 2009/0051929 A1 | 2/2009 | Koh et al. | |
| 2009/0128648 A1 | 5/2009 | Ikeda et al. | |

FOREIGN PATENT DOCUMENTS

| | | |
|---|---|---|
| CN | 1615426 | 5/2005 |
| CN | 1748120 | 3/2006 |
| CN | 101010559 A | 8/2007 |
| CN | 101182996 | 5/2008 |
| JP | 2-216407 A | 8/1990 |
| JP | 10-300448 A | 11/1998 |
| JP | 2003-532062 A | 10/2003 |
| JP | 2005-114642 | 4/2005 |
| JP | 2007-132836 A | 5/2007 |
| KR | 1995-0009067 B1 | 8/1995 |
| KR | 0141444 B1 | 3/1998 |
| KR | 10-0294872 B1 | 4/2001 |
| KR | 2002-0082738 A | 10/2002 |
| KR | 2003-0061644 A | 7/2003 |
| KR | 10-2004-0077851 A | 9/2004 |
| KR | 10-2005-0044446 A | 5/2005 |
| KR | 10-2007-0122014 | 12/2007 |
| KR | 10-2007-0122014 A | 12/2007 |
| WO | 03/060425 | 7/2003 |
| WO | WO 03/060425 A1 | 7/2003 |

* cited by examiner

[Fig.1]
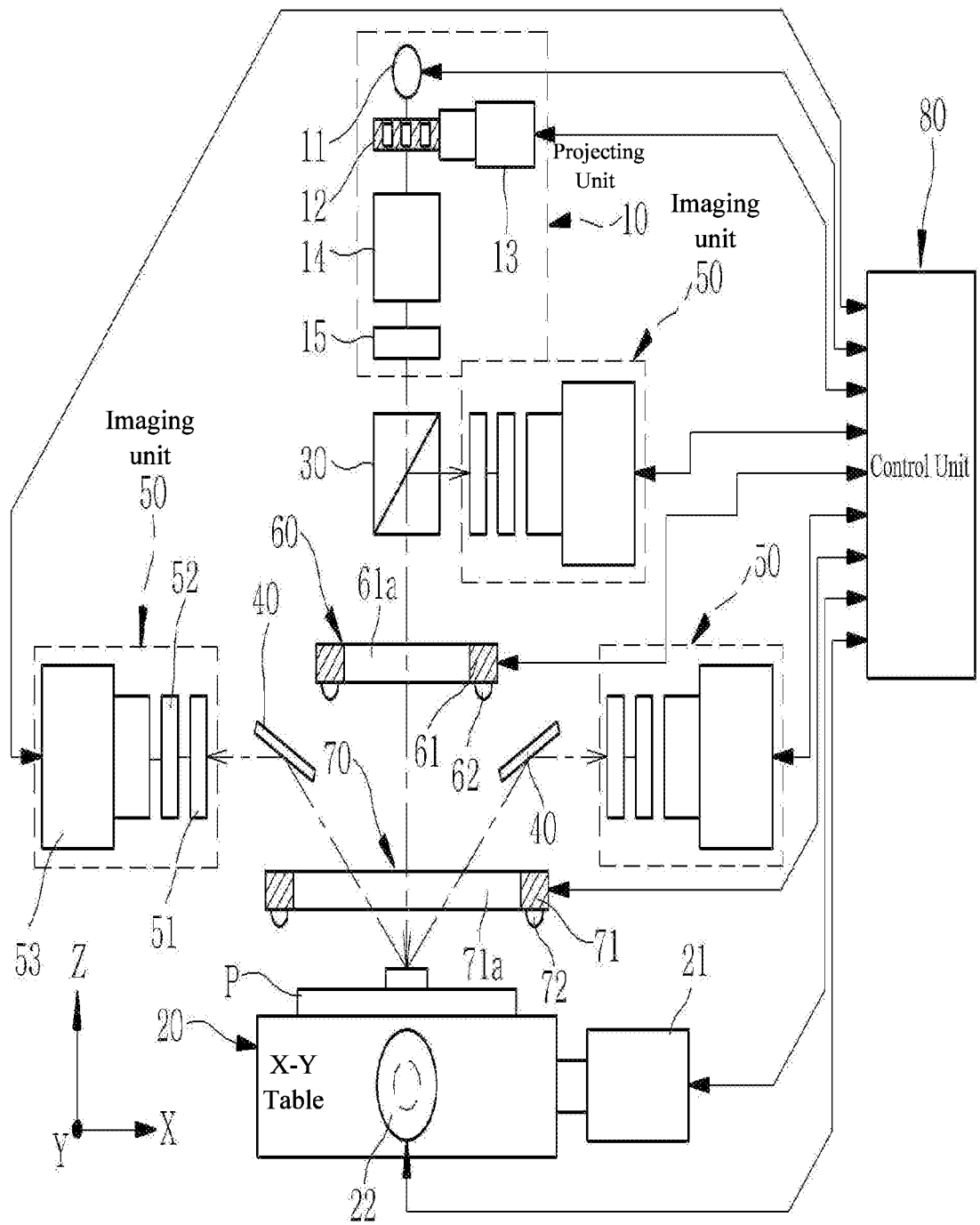

[Fig. 2]
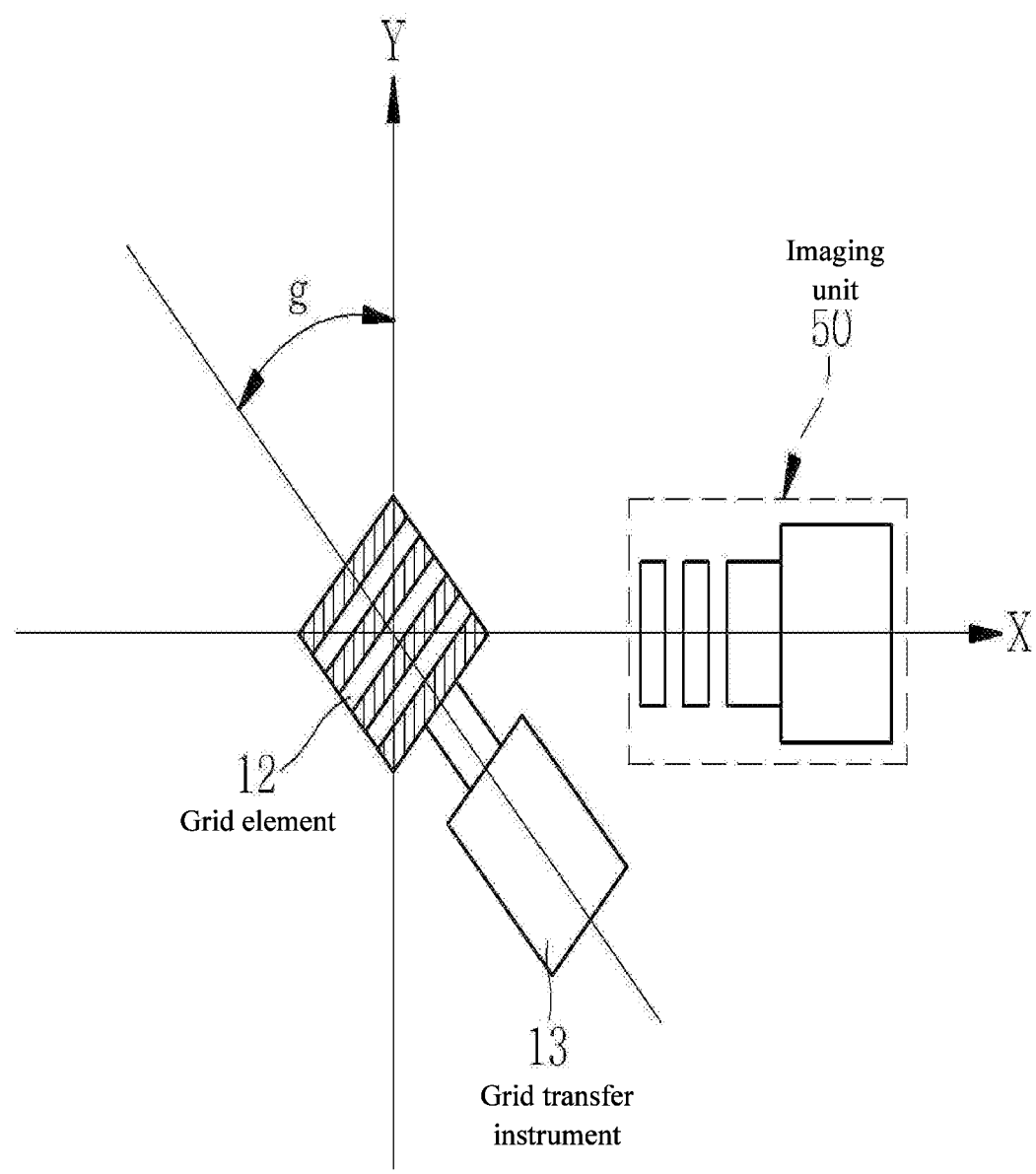

[Fig.3]
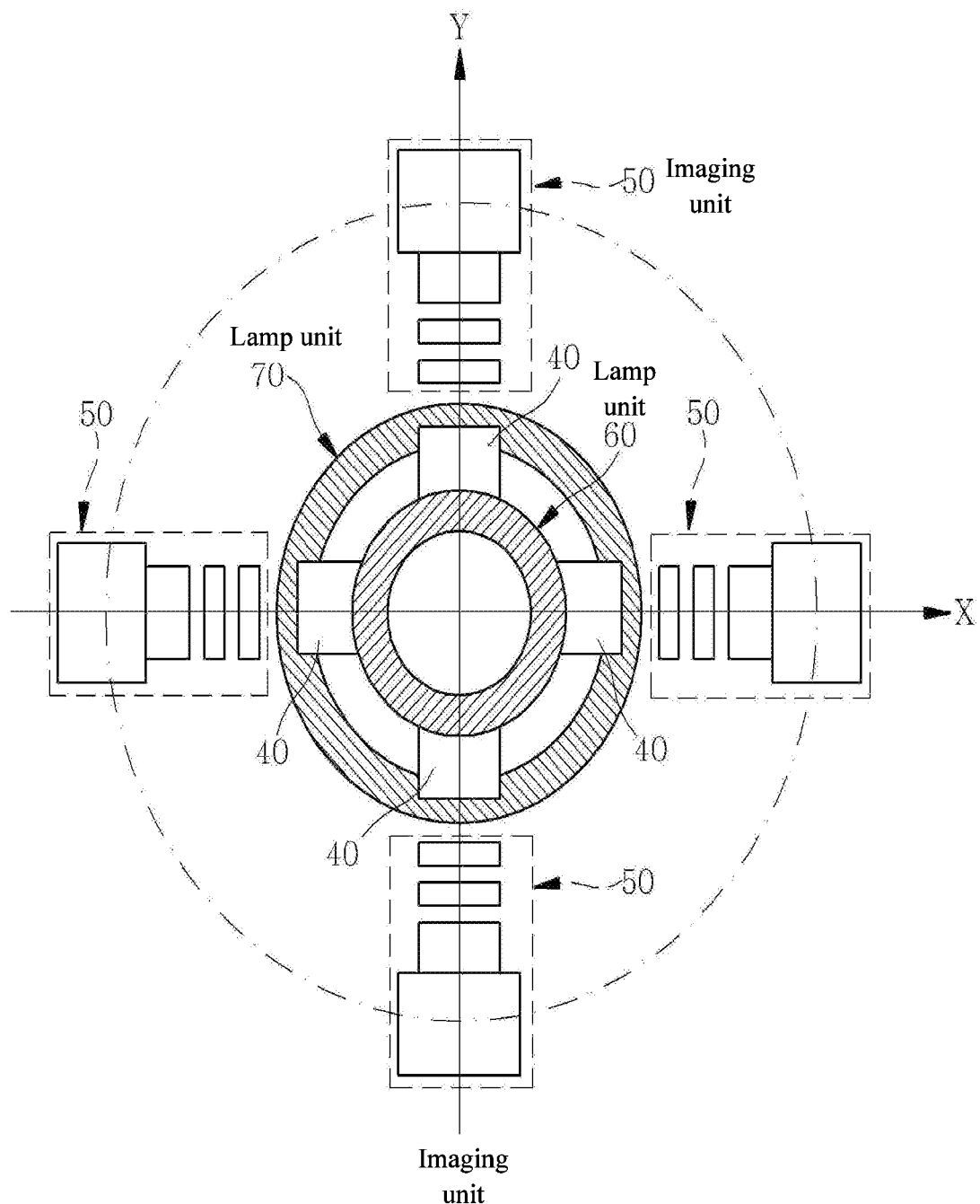

[Fig.4]
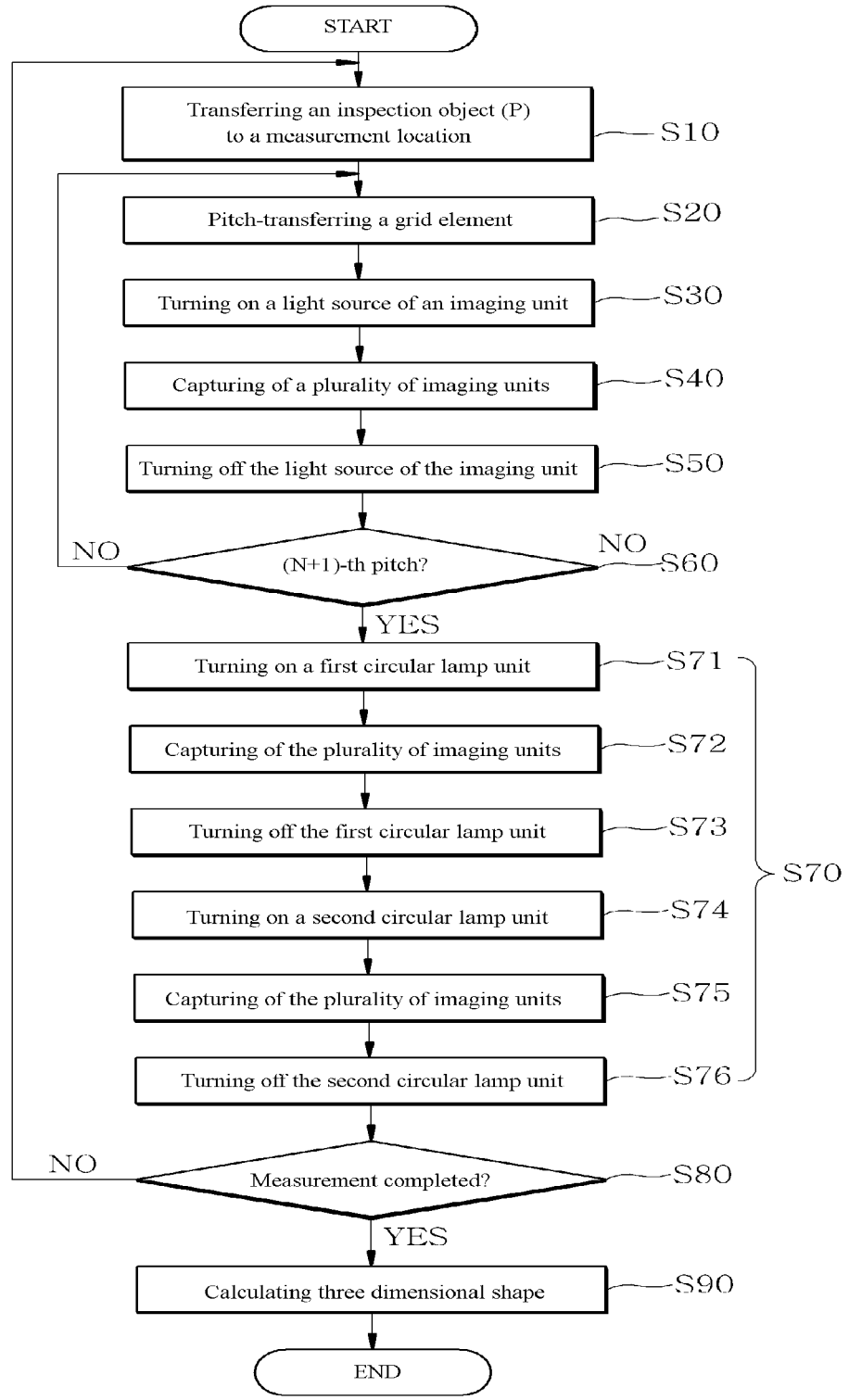

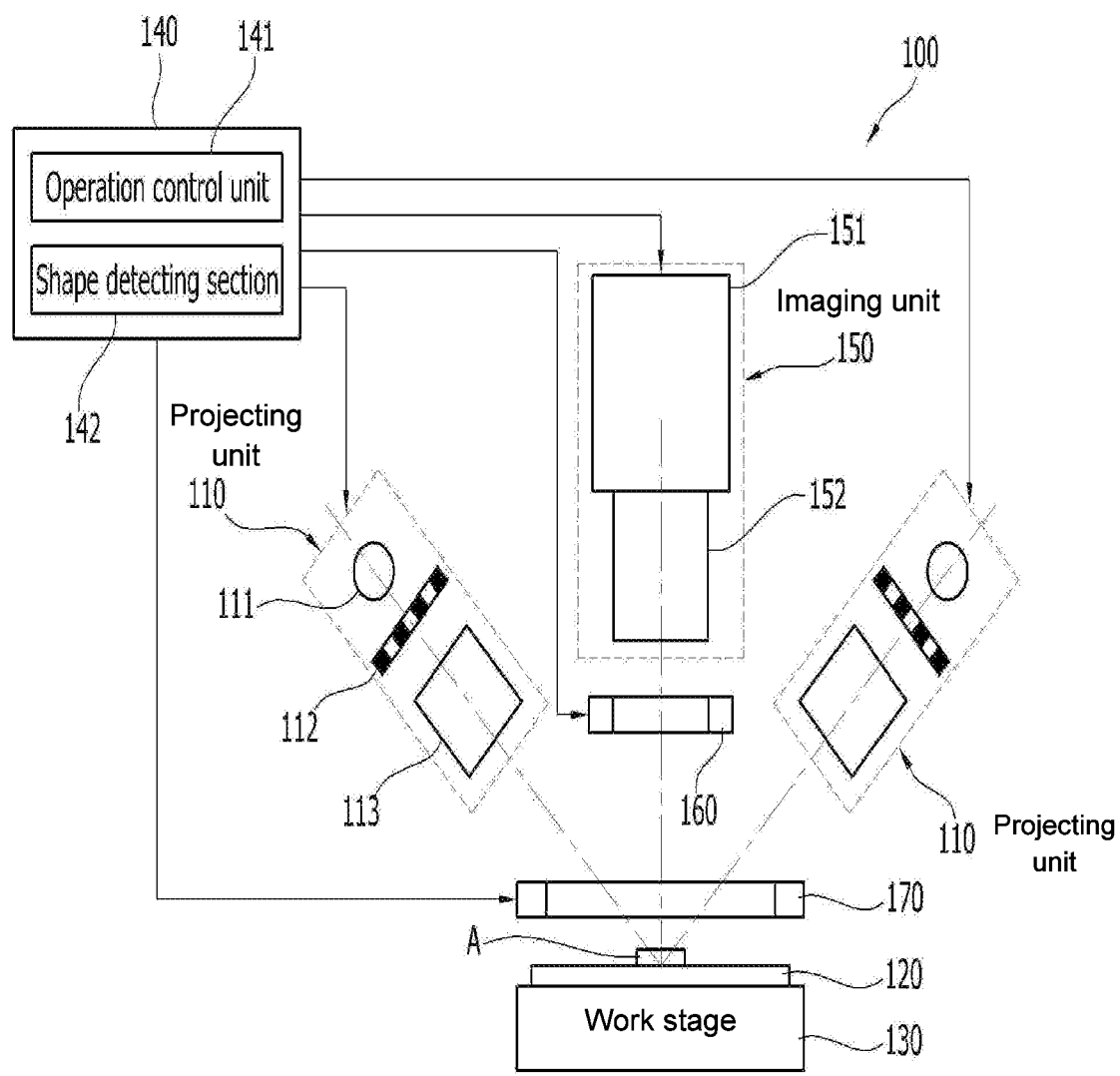

[Fig.6]
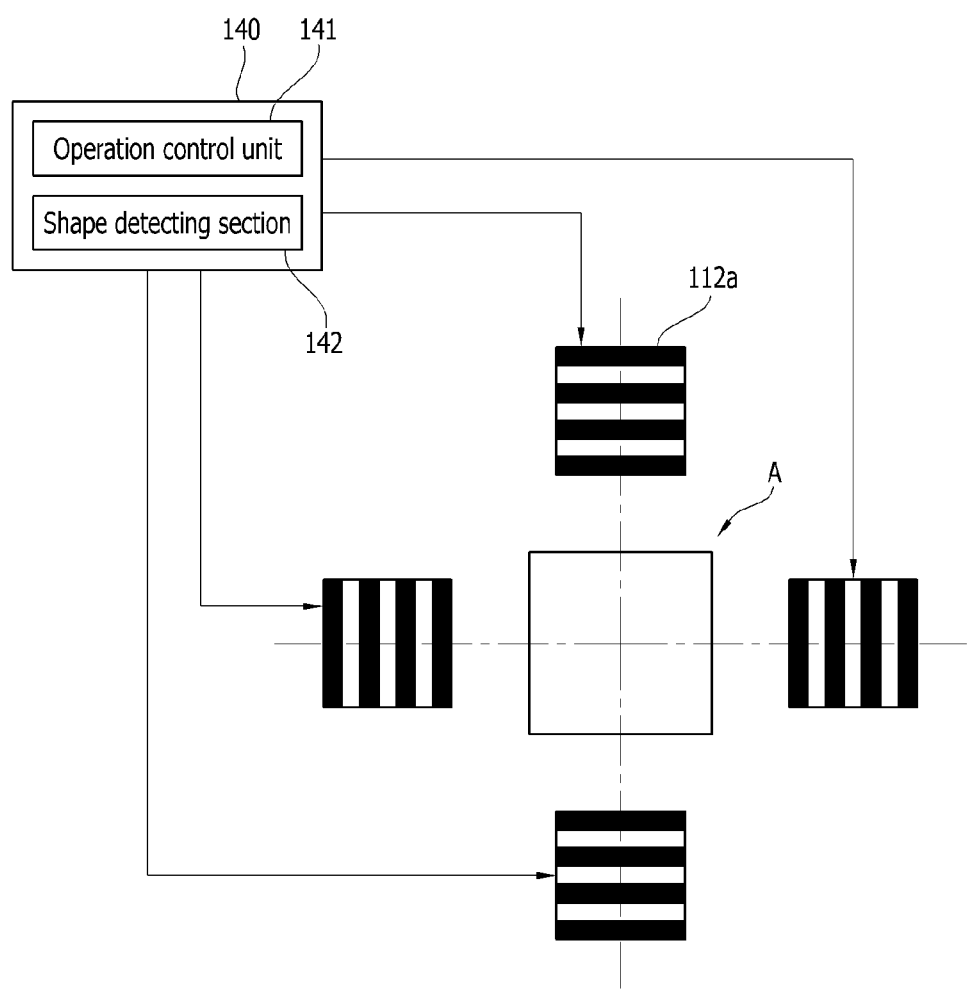

[Fig.7]
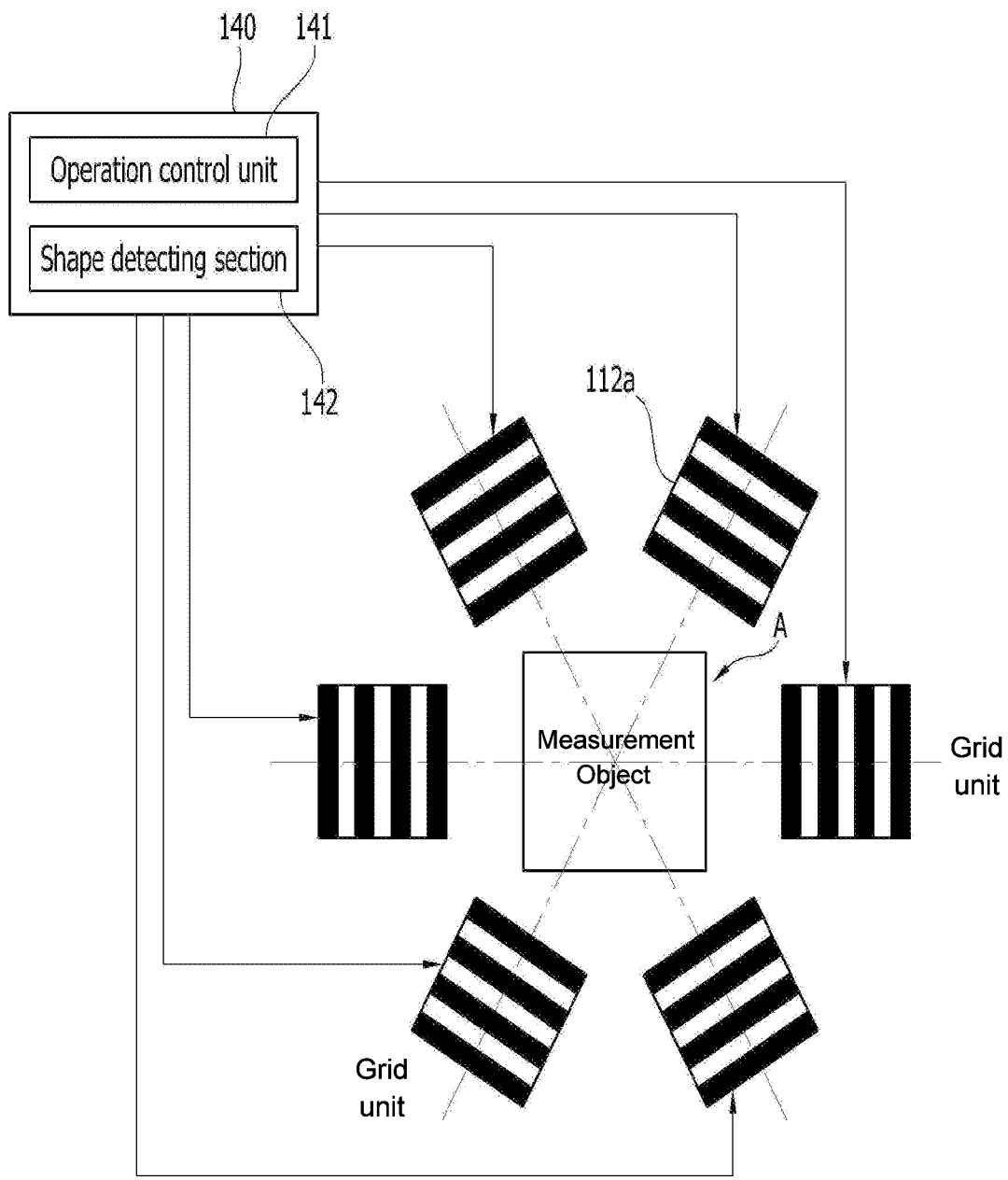

[Fig.8]
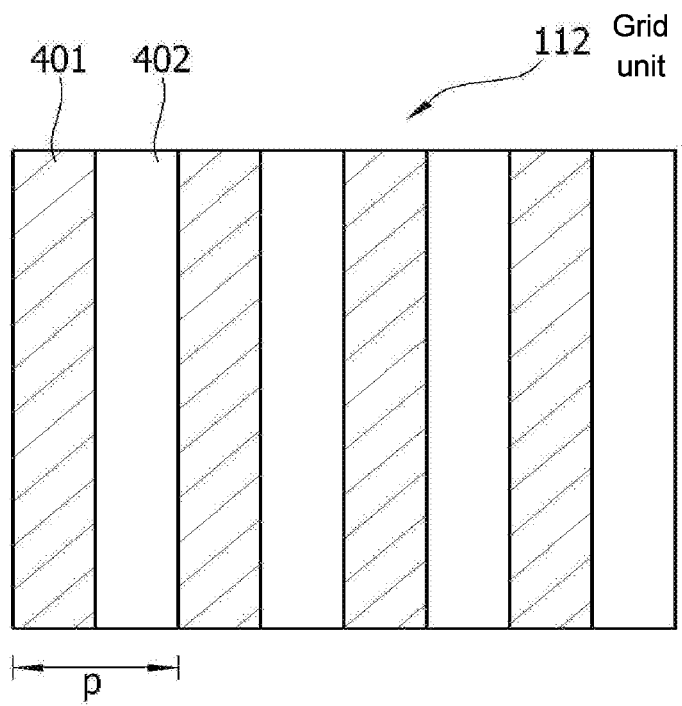
[Fig.9]
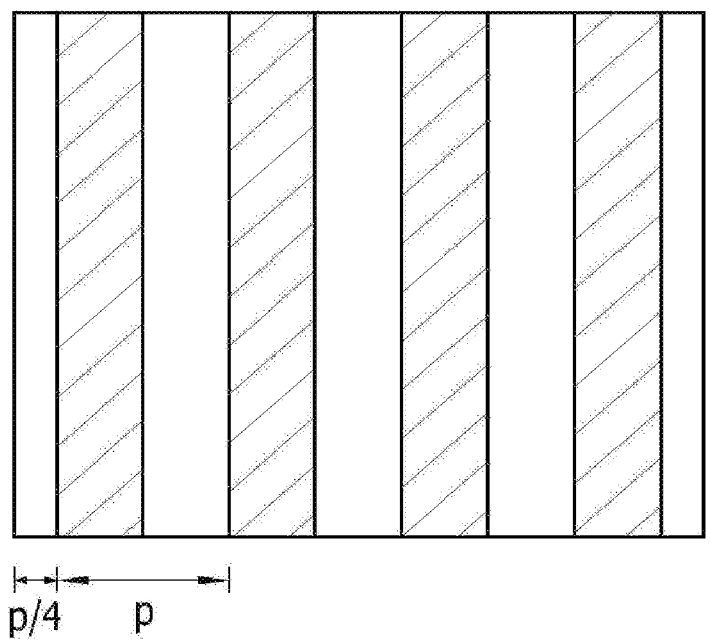

[Fig.10]
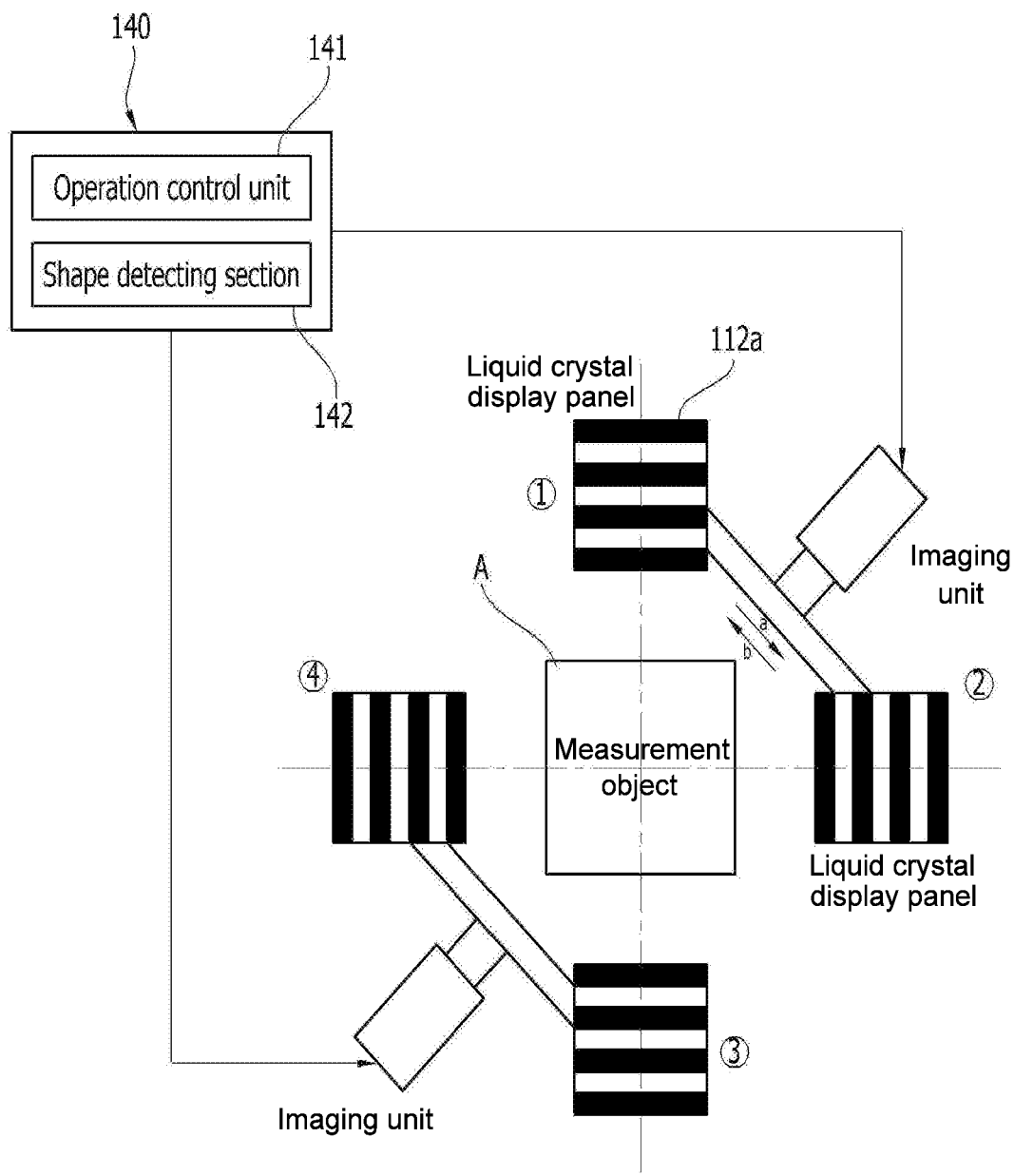

[Fig.11]
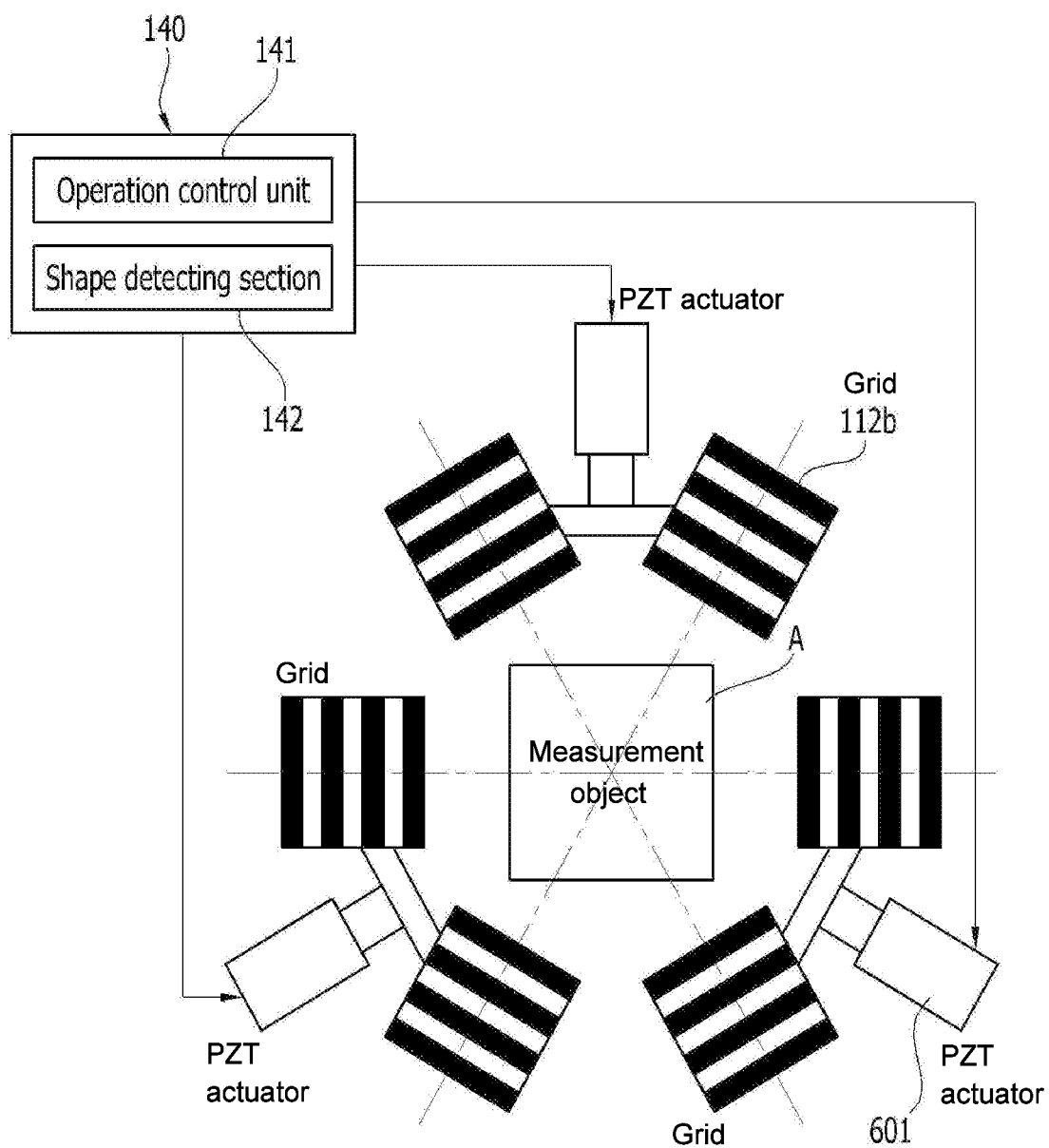

[Fig.12]
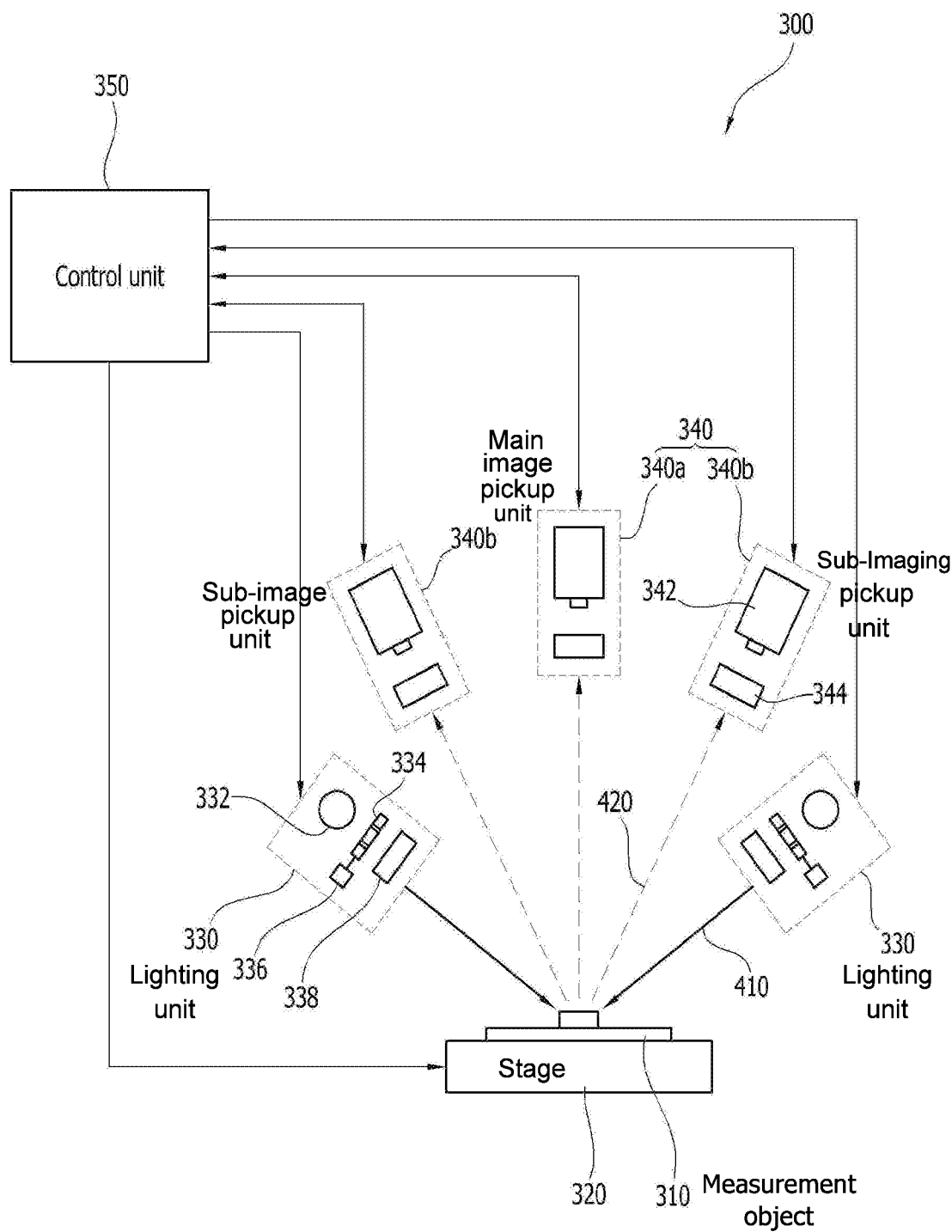

[Fig.13]
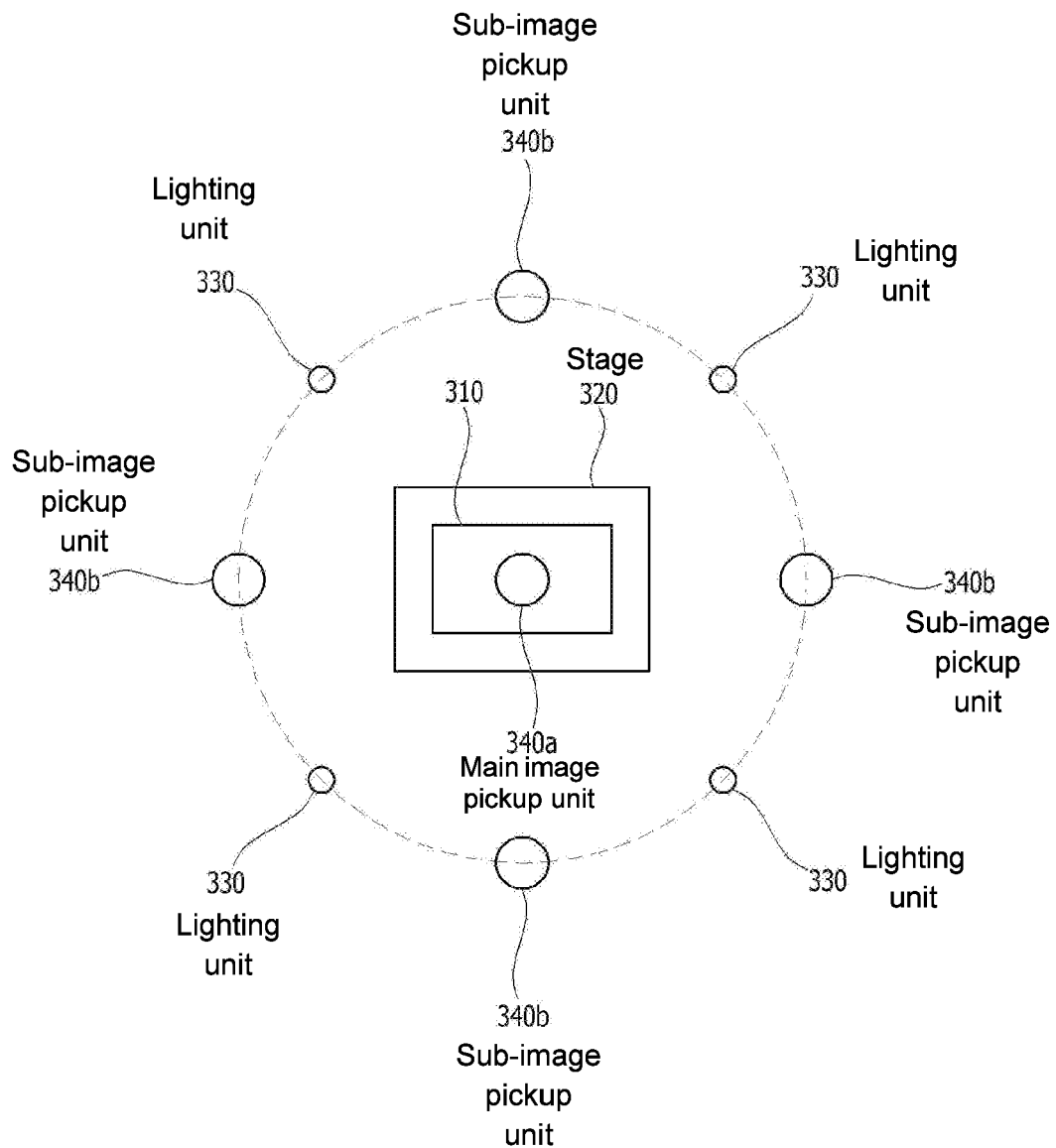

[Fig.14]
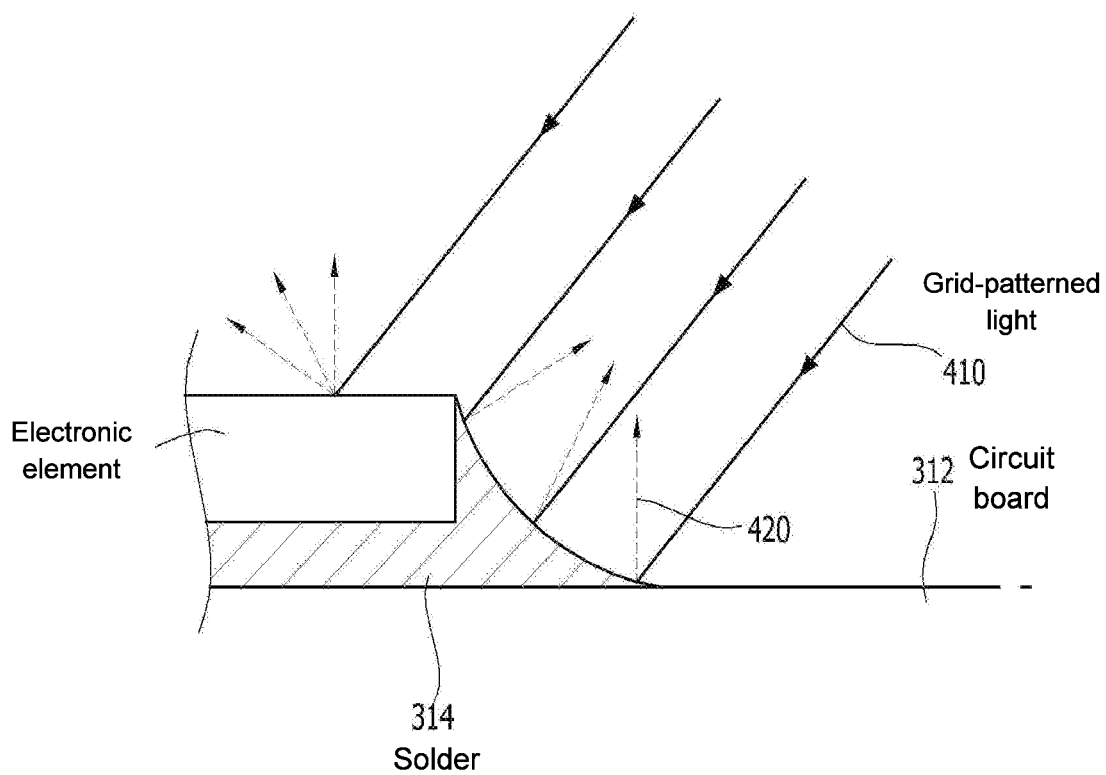

[Fig.15]
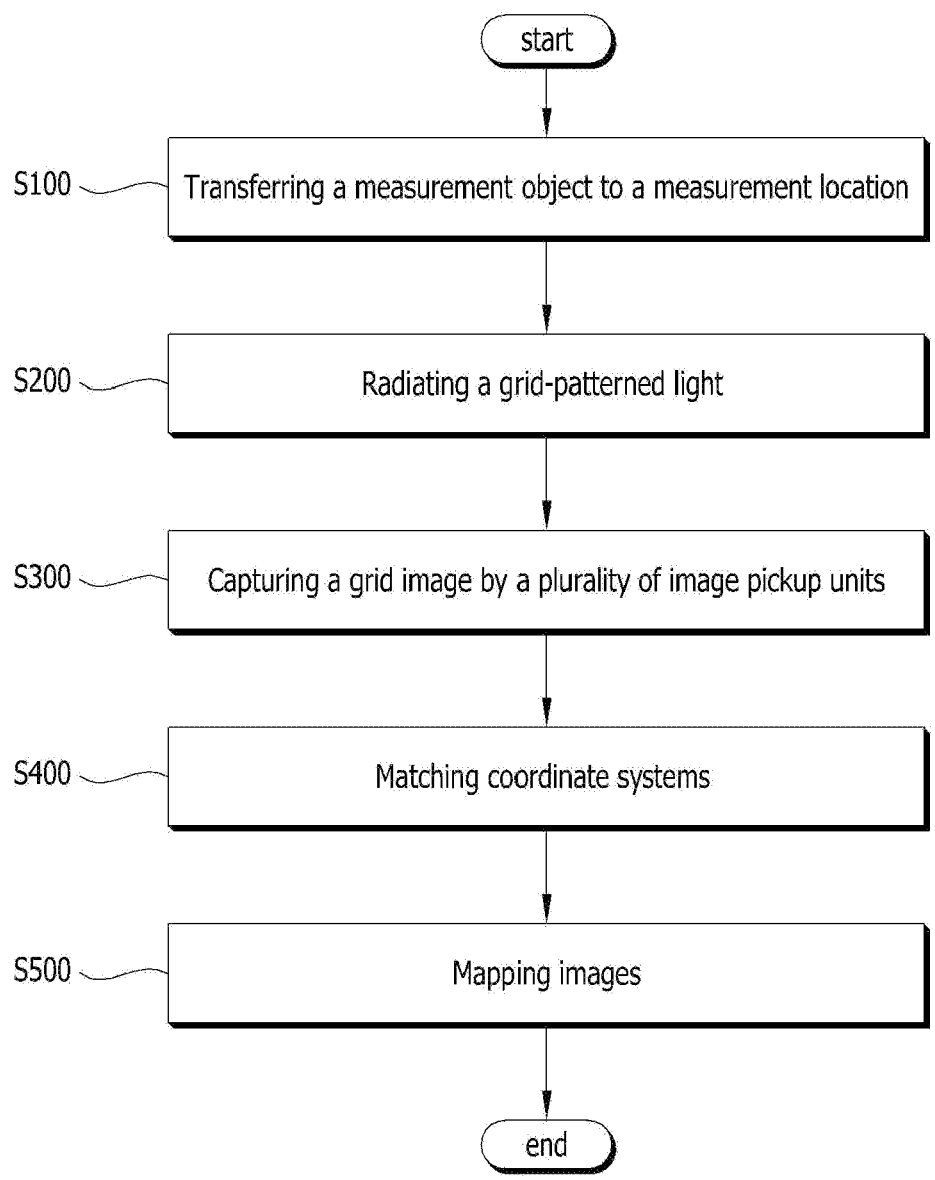

APPARATUS AND METHOD FOR MEASURING A THREE DIMENSIONAL SHAPE

CROSS REFERENCE TO RELATED APPLICATIONS

This application is a continuation of U.S. application Ser. No. 15/331,499, filed Oct. 21, 2016, which is a continuation of U.S. application Ser. No. 14/463,269, filed Aug. 19, 2014 (now U.S. Pat. No. 9,488,472), which is a division of U.S. application Ser. No. 12/919,691, filed Nov. 3, 2010 (now U.S. Pat. No. 8,854,610), which is a national stage entry of International Application No. PCT/KR2009/00904, filed Feb. 25, 2009, which claims priority to Korean Application No. 10-2008-0017439 filed on Feb. 26, 2008, Korean Application No. 10-2008-0082629 filed on Aug. 23, 2008, and Korean Application No. 10-2009-0015691 filed on Feb. 25, 2009; the entire contents of each of the above are incorporated herein by reference.

TECHNICAL FIELD

The present invention relates to an apparatus and a method for measuring a three dimensional shape, and more particularly to an apparatus and a method for measuring a three dimensional shape capable of increasing measurement precision for the three dimensional shape of a measurement target.

BACKGROUND ART

Generally, an apparatus for measuring a three dimensional shape is an apparatus measuring a three dimensional shape of a measurement object by radiating a grid-patterned light to the measurement object, receiving a grid image reflected from the measurement object and analyzing the grid image.

A conventional apparatus for measuring a three dimensional shape have had one projecting unit for radiating a grid-patterned light to a measurement object and one imaging unit for capturing a grid image reflected from the measurement object.

As described above, in case that a grid-patterned light is radiated at only one side in order to measure a three dimensional shape of a measurement object, a shadow region, at which a grid image does not arrive due to protrusion of the measurement object, is formed at the other side, thereby making it difficult to obtain a perfect three dimensional shape of the measurement object. In order to improve this, the three dimensional shape of the measurement object is measured by using the method that a grid-patterned light is radiated again after rotating and moving the projecting unit to the other side, but a problem of requiring relatively much measurement time occurs.

In addition, in case of capturing a grid image by using only one imaging unit, there has been a problem that a picture of a regular reflection surface cannot be accurately acquired due to regular reflection of the measurement object. In order to improve this, a method, in which regular reflectivity is reduced by using a filter or a control of light amount to acquire a picture of a regular reflect surface, is sometimes used, but in this case, there occurs a problem of reduction of measurement precision because a grid pattern of a three dimensional surface having a great regular reflectivity appears well but a grid pattern of an peripheral area does not appear well.

Disclosure of Invention Technical Problem

Thus, the present invention obviates the above problems, and thus the present invention provides an apparatus and a method for measuring a three dimensional shape capable of enhancing productivity of measuring a three dimensional shape of a measurement object and enhancing measurement precision.

Technical Solution

In accordance with an aspect of the present invention, an apparatus for measuring a three dimensional shape includes a projecting unit generating and radiating a grid-patterned light, an X-Y axis transferring table installed under the projecting unit to transfer an inspection object, a beam splitting unit installed between the projecting unit and the X-Y axis transferring table to split and pass a grid image reflected from the inspection object, a plurality of reflecting mirrors installed under the beam splitting unit and spaced apart from each other in a circumferential direction to reflect the grid image when the grid image reflected from the inspection object is radiated, and a plurality of imaging units installed at a side of the beam splitting unit and at sides of the plurality of reflecting mirrors, respectively, to capture the grid image passing through the beam splitting unit and the grid image reflected from the plurality of reflecting mirrors.

In accordance with an aspect of the present invention, a method for measuring a three dimensional shape includes transferring an inspection object to a measurement location by an X-Y axis transferring table, pitch-transferring a grid element by a grid transfer instrument, after the inspection object is transferred to the measurement location, turning on a light source of an imaging unit to radiate a grid-patterned light to the inspection object, after the grid element is pitch-transferred, receiving a grid image reflected from the inspection object via a plurality of reflecting mirrors to capture the grid image in a plurality of imaging units, after the grid-patterned light is radiated to the inspection object, turning off the light source of the imaging unit, after the grid image is captured in the plurality of imaging units, checking whether the grid element is pitch-transferred by N+1 times by using a control unit, after the light source of the imaging unit is turned off, turning on a first circular lamp unit or a second circular lamp unit and photographing the inspection object by the plurality of imaging units, after the grid element is pitch-transferred by N+1 times, checking whether measurement of the inspection object is completed, after the inspection object is photographed by the plurality of imaging units, and turning on the first circular lamp unit or the second circular lamp unit by using the control unit and calculating a three dimensional shape of the inspection object by using an image of the inspection object, in which the inspection object is photographed, and the grid image captured in the plurality of imaging units, after the measurement of the inspection object is completed.

In accordance with another aspect of the present invention, an apparatus for measuring a three dimensional shape includes a measurement board, a work-stage, a plurality of projecting units, an imaging unit and a control unit. The work-stage fixes the measurement board. The plurality of projecting units, each of which includes a light source, a grid passing a light radiated from the light source and a projecting lens part imaging a grid-patterned light of the grid to a measurement object in the measurement board, radiates grid-patterned lights in different directions with respect to the measurement object. The imaging unit receives a grid image reflected by the measurement object. The control unit selectively turns on/off at least two of the plurality of projecting units according to a shape of the measurement object. A three dimensional shape of the measurement object is measured by using the grid image received in the imaging unit by the at least two projecting units that are selectively turned on.

In accordance with still another aspect of the present invention, an apparatus for measuring a three dimensional shape includes a work-stage, a plurality of projecting units, an actuator, an imaging unit and a control unit. The work-stage fixes a measurement board. The plurality of projecting units, each of which includes a light source, a grid passing a light radiated from the light source and a projecting lens part imaging a grid-patterned light of the grid to a measurement object in the base member, is arranged in a regular polygon form so as to radiate grid-patterned lights in different directions with respect to the measurement object, a direction in which the light radiated from the light source advances and a normal line of the base member forming a constant angle.

In accordance with still another aspect of the present invention, an apparatus for measuring a three dimensional shape includes a stage, at least one lighting unit, a plurality of image pickup units, and a control unit. The stage supports a measurement object. The lighting unit includes a light source and a grid and radiating a grid-patterned light to the measurement object. The image pickup units capture a grid image reflected from the measurement object in different directions. The control unit calculates a three dimensional shape of the measurement object by using the grid images captured by the image pickup units. The image pickup units include a main image pickup portion and a plurality of sub image pickup portions. The main image pickup portion is disposed vertical with respect to a reference surface of the stage. The sub image pickup portions are disposed inclined with respect to the reference surface of the stage by a constant angle, and spaced apart from each other along a circumferential direction around the main image pickup portion. The control unit may match coordinate systems of the grid images captured by the main image pickup portion and the sub image pickup portions, calculate a reliability index (visibility) for each of the matched grid images, and apply a weight to the calculated reliability index, to calculate the three dimensional shape of the measurement object.

In accordance with still another aspect of the present invention, an apparatus for measuring a three dimensional shape includes a stage, at least one lighting unit, a main image pickup portion, a sub image pickup portion, and a control unit. The stage supports a measurement object. The lighting unit radiates a grid-patterned light to the measurement object. The main image pickup portion captures a main image out of a grid image formed by the grid-patterned light reflected from the measurement object. The sub image pickup portion captures a sub image that is not incident on the main image pickup portion by regular reflection, out of the grid image formed by the grid-patterned light reflected from the measurement object. The control unit calculates a three dimensional shape of the measurement object by using the main image and the sub image captured by the main image pickup portion and the sub image pickup portion. The control unit may match coordinate systems of the grid images captured by the main image pickup portion and the sub image pickup portions, calculate a reliability index (visibility) for each of the matched grid images, and apply a weight to the calculated reliability index, to calculate the three dimensional shape of the measurement object.

In accordance with another aspect of the present invention, according to a method for measuring a three dimensional shape, firstly, a measurement object is transferred to a measurement location by transfer of a stage. Then, a grid-patterned light is radiated to the measurement object by at least one lighting unit. Thereafter, a grid image reflected from the measurement object in different directions is captured by a plurality of image pickup units. Then, a three dimensional shape of the measurement object is calculated by using the grid images captured by the image pickup units. Capturing the grid image may include capturing a main image out of the grid image reflected from the measurement object by a main image pickup portion disposed vertical with respect to a reference surface of the stage, and capturing a sub image that is not incident in the main image pickup portion by regular reflection, out of the grid image reflected from the measurement object, by a plurality of sub image pickup portions disposed inclined with respect to the reference surface of the stage by a constant angle, and spaced apart from each other along a circumferential direction around the main image pickup portion, at the same time of capturing the main image. Calculating the three dimensional shape of the measurement object may include matching coordinate systems of the main image and the sub images respectively captured by the main image pickup portion and the sub image pickup portions, and calculating a reliability index (visibility) for each of the matched main and sub images, and applying a weight to the calculated reliability index, to map weight-applied data.

Advantageous Effects

According to the apparatus and the method for measuring a three dimensional shape, a three dimensional shape of a measurement object is measured by a plurality of projecting units or a plurality of imaging units, thereby reducing measurement time and enhancing measurement precision.

BRIEF DESCRIPTION OF THE DRAWINGS

The above and other objects, features and other advantages of the present invention will be more clearly understood from the following detailed description taken in con junction with the accompanying drawings, in which:

FIG. 1 is a structural view illustrating a structure of an apparatus for measuring a three dimensional shape according to Embodiment 1 of the present invention.

FIG. 2 is a plan view illustrating a projecting unit shown in FIG. 1.

FIG. 3 is a plan view illustrating second and third light sources shown in FIG. 1.

FIG. 4 is a flow chart illustrating a method for measuring a three dimensional shape according to Embodiment 1 of the present invention.

FIG. 5 is a schematic side view illustrating an apparatus for measuring a three dimensional shape according to Embodiment 2 of the present invention.

FIG. 6 is a schematic plan view illustrating an exemplary embodiment of the apparatus for measuring a three dimensional shape shown in FIG. 5.

FIG. 7 is a schematic plan view illustrating another exemplary embodiment of the apparatus for measuring a three dimensional shape shown in FIG. 5.

FIGS. 8 and 9 is a plan view illustrating an operation of a liquid crystal display panel forming a grid unit shown in FIG. 6 or FIG. 7.

FIG. 10 is a schematic plan view illustrating still another exemplary embodiment of the apparatus for measuring a three dimensional shape shown in FIG. 5.

FIG. 11 is a schematic plan view illustrating still another exemplary embodiment of the apparatus for measuring a three dimensional shape shown in FIG. 5.

FIG. 12 is a schematic view illustrating an apparatus for measuring a three dimensional shape according to Embodiment 3 of the present invention.

FIG. 13 is a plan view illustrating the apparatus for measuring a three dimensional shape shown in FIG. 12.

FIG. 14 is an enlarged view, in which a measurement object is enlarged so as to explain a process of measuring a three dimensional shape of a measurement object shown in FIG. 12.

FIG. 15 is a flow chart illustrating a method for measuring a three dimensional shape according to Embodiment 3 of the present invention.

MODE FOR THE INVENTION

Hereinafter, preferred embodiments of the present invention will be described in detail with reference to the annexed drawings.

Embodiment 1

FIG. 1 is a structural view illustrating a structure of an apparatus for measuring a three dimensional shape according to Embodiment 1 of the present invention. FIG. 2 is a plan view illustrating a projecting unit shown in FIG. 1. FIG. 3 is a plan view illustrating second and third light sources shown in FIG. 1. A first circular lamp unit 60 or a second circular lamp unit 70 shown in FIG. 1 is respectively shown in a side cross-sectional status. A first circular lamp unit 60 or a second circular lamp unit 70 in FIG. 2 is respectively shown in a plan cross-sectional status.

As shown in FIGS. 1 to 3, an apparatus for measuring a three dimensional shape according to the present embodiment includes a projecting unit 10, an X-Y axis transferring table 20, a beam splitting unit 30, a plurality of reflecting mirrors 40 and a plurality of imaging units 50, and each element is described as follows.

The projecting unit 10 generates and radiates a grid-patterned light, and the X-Y axis transferring table 20 is installed under the projecting unit 10 to transfer an inspection object P. The beam splitting unit 30 is installed between the projecting unit 10 and the X-Y axis transferring table 20 to split and pass a grid image reflected from the inspection object P. The plurality of reflecting mirrors 40 is installed under the beam splitting unit 30 and spaced apart from each other in a circumferential direction to reflect the grid image when the grid image reflected from the inspection object P is radiated. The plurality of imaging units 50 is installed at a side of the beam splitting unit 30 and at sides of the plurality of reflecting mirrors 40, respectively, to capture the grid image passing through the beam splitting unit 30 and the grid image reflected from the plurality of reflecting mirrors 40.

The detail structure of the projecting unit 10, the X-Y axis transferring table 20, the beam splitting unit 30, the plurality of reflecting mirrors 40 and the plurality of imaging units 50 forming the apparatus for measuring a three dimensional shape according to the present embodiment is described as follows.

The projecting unit 10 includes a light source 11, a grid element 12, a grid transfer instrument 13, a projecting lens 14 and a projecting lens filter 15.

The light source 11 of the projecting unit 10 generates and radiates a light. The grid element 12 is installed under the light source 11 and converts the light radiated from the light source 11 into a grid-patterned light and radiates the grid-patterned light. An inclination angle g of the grid element 12 that converts the light into the grid-patterned light is 45 degrees with respect to Y-axis direction of an X-Y plane, as shown in FIG. 2. The grid transfer instrument 13 employs a PZT (piezoelectric), which is installed at the grid element 12 to transfer the grid element 12, and the projecting lens 14 is installed under the grid element 12 to project the grid-patterned light. The projecting lens filter 15 is installed under the projecting lens 14 to filter and radiate the grid-patterned light radiated via the projecting lens 14.

X-Y axis transferring table 20 includes a motor 21 to move the X-Y axis transferring table 20 in an X-axis direction and a motor 22 to move the X-Y axis transferring table 20 in a Y-axis direction, and align the inspection object P or transfer the inspection object P to a measurement location.

The beam splitting unit 30 employs a beam splitter to radiate a grid image generated by the projecting unit 10 or an image formed by the light that is generated from the first circular lamp unit 60 or the second circular lamp unit 70 and radiated to and reflected from the inspection object P, to one imaging unit 50 of the plurality of imaging units 50, which is installed at a side of the beam splitting unit 30.

The plurality of reflecting mirrors 40 is installed inclined with respect to an X-axis direction to radiate the grid image reflected from the inspection object P to the remaining plurality of imaging units 50 except the imaging unit 50 installed corresponding to the beam splitting unit 30, and spaced apart from each other in a circumferential direction. In other words, the plurality of reflecting mirrors 40 is installed apart from each other by a regular interval along a circle shown in a dotted line in FIG. 3.

The plurality of imaging units 50 simultaneously captures the grid image reflected from the reflecting mirror 40, and each of the imaging units 50 includes a camera filter 51, an imaging lens 52 and a camera 53. The camera filter 51 filters and radiates the grid image reflected from the reflecting mirror 40. The camera filter 51 filtering the grid image employs one of a frequency filter, a color filter and a light intensity control filter. The imaging lens 52 is installed at a side of the camera filter 51 to image the grid image filtered by the camera filter, and the grid image that is imaged and radiated by the imaging lens 52 is captured by the camera 53. The camera 53 is installed at a side of the imaging lens 52 to capture the grid image radiated from the imaging lens 52.

The apparatus for measuring a three dimensional shape having the above structure according to the present embodiment further includes a first circular lamp unit 60 and a second circular lamp unit 70 to capture a two-dimensional image for extracting a specific shape of the inspection object P, i.e., a light image, and a control unit 80 is further provided to control the above elements.

The first circular lamp unit 60 and the second circular lamp unit 70 further provided to the apparatus for measuring a three dimensional shape are described as follows.

The first circular lamp unit 60 is installed under the beam splitting unit 30 to generate and radiate a light to the inspection object P so that a light image is reflected from the inspection object P. The second circular lamp unit 70 is installed under the plurality of reflecting mirrors 40 to generate and radiate a light to the inspection object P so that a light image is reflected from the inspection object P. The first circular lamp unit 60 and the second circular lamp unit 70 radiating the light to the inspection object P respectively includes circular ring members 61 and 71 and a plurality of light generating elements 62 and 72.

The circular ring members 61 and 71 have throughholes 61a and 71a to pass the grid-patterned light or the grid image. The throughhole 71a of the second circular lamp unit 70 has a diameter greater than the throughhole 61a of the first circular lamp unit 60 so that the light radiated from the first circular lamp unit 60 is radiated to the inspection object P or the grid image reflected from the inspection object P is radiated to the plurality of reflecting mirrors 40. The plurality of light generating elements 62 and 72 is installed under the circular ring members 61 and 71 to radiate a light.

After the light is generated from the first circular lamp unit 60 or the second circular lamp unit 70 and radiated to the inspection object P, the light image reflected from the inspection object P is radiated to the beam splitting unit 30 and the plurality of reflecting mirrors 40. The light image radiated to the beam splitting unit 30 and the plurality of reflecting mirrors 40 is captured by the plurality of imaging units 50, respectively.

The grid image or the light image captured by the plurality of imaging units 50 is received in the control unit 80. After receiving the grid image or the light image, the control unit 80 calculates the three dimensional shape of the inspection object P by using the grid image or the light image. The control unit 80 calculating the three dimensional shape of the inspection object P generally controls the apparatus for measuring a three dimensional shape according to the present embodiment, such as the projecting unit 10, the X-Y axis transferring table 20, the plurality of imaging units 50, the first circular lamp unit 60, the second circular lamp unit 70, etc.

A method for measuring a three dimensional shape using the apparatus for measuring a three dimensional shape having the above structure according to the present embodiment is described as follows with reference to FIGS. 1 and 4 attached herewith.

As shown in FIGS. 1 and 4, in a method for measuring a three dimensional shape according to the present embodiment, firstly, the inspection object P is transferred to a measurement location by the X-Y axis transferring table 20 in step S10. After the inspection object P is transferred to the measurement location, the grid element 12 is pitch-transferred by the grid transfer instrument 13 in step S20. After the grid element 12 is pitch-transferred, the light source 11 of the projection 1 unit 10 is turned on to radiate the grid-patterned light to the inspection object P in step S30.

After the grid-patterned light is radiated onto the inspection object P, a grid image reflected from the inspection object P is received via the plurality of reflecting mirrors 40 to capture the grid image in the plurality of imaging units 50 in step S40. When capturing the grid image, the plurality of imaging units 50 simultaneously captures the grid image. After the grid image is captured by the plurality of imaging units 50, the light source 11 of the imaging unit 50 is turned off in step S50.

After the light source 11 of the imaging unit 50 is turned off, the control unit 80 checks whether the grid element 12 is pitch-transferred by N+1 times in step S60. Step S60, in which it is checked whether the grid element 12, is pitch-transferred by N+1 times or not, returns step S20, in which grid element 12 is pitch-transferred, when the grid element 12 is not pitch-transferred by N+1 times. In other words, in case that the three dimensional shape of the inspection object P is calculated by using 4-bucket algorithm, the grid element 12 is 4 times transferred by a pitch interval thereof.

When the grid element 12 is pitch-transferred by N+1 times, the first circular lamp unit 60 or the second circular lamp unit 70 is turned on, and then the inspection object P is photographed by the plurality of imaging units 50 in step S70. In other words, two dimensional image of the inspection object P, i.e., a light image is captured.

A method of capturing the light image is described in detail as follows. Firstly, when the grid element 12 is pitch-transferred by N+1 times, the first circular lamp unit 60 is turned on in step S71. After the first circular lamp unit 60 is turned on, the inspection object P is photographed by the plurality of imaging units 50 in step S72. After the inspection object P is photographed by the plurality of imaging units 50, the first circular lamp unit 60 is turned off in step S73. After the first circular lamp unit 60 is turned off, the second circular lamp unit 70 is turned on in step S74. After the second circular lamp unit 70 is turned on, the inspection object P is photographed by the plurality of imaging units 50 in step S75. After the inspection object P is photographed by the plurality of imaging units 50, the second circular lamp unit 70 is turned off in step S76. As described above, the light image is captured by the plurality of imaging units 50 according to the light generated from the first circular lamp unit 60 or the second circular lamp unit 70, and thus specific things of the inspection object P in various directions may be more rapidly photographed.

After the light image is captured and the inspection object P is photographed by the plurality of imaging units 50, it is checked whether measurement of the inspection object P is completed or not in step S80. Step S80, in which it is checked whether the measurement of the inspection object P is completed or not, returns step of transferring the inspection object P to the measurement location, when the measurement of the inspection object P is not completed. On the contrary, when the measurement of the inspection object P is completed, the control unit 80 turns on the first circular lamp unit 60 or the second circular lamp unit 70, and then calculates the three dimensional shape of the inspection object P by using the measured image of the inspection object P and the grid image measured by the plurality of imaging units 50 in step S90.

As described above, the inspection object is simultaneously photographed by using the plurality of imaging units to calculate the three dimensional shape of the inspection object, thereby reducing measuring time of the three dimensional shape of the inspection object.

Embodiment 2

FIG. 5 is a schematic side view illustrating an apparatus for measuring a three dimensional shape according to Embodiment 2 of the present invention.

Referring to FIG. 5, an apparatus for measuring a three dimensional shape 100 according to the present embodiment includes a work-stage 130, a plurality of projecting units 110, an imaging unit 150 and a control unit 140.

The work-stage 130 fixes a measurement board 120. The measurement board 120 includes a measurement object A.

The work-stage 130 transfers and fixes the measurement board 120 in an x-axis direction or a y-axis direction. After the measurement board 120 is transferred and fixed by control of the control unit 140, a first assistant light source 160 and a second assistant light source 170 radiate lights to the measurement object A, and an entire measurement area of the measurement board 120 is set by using an identification mark indicated at the measurement board 120.

The plurality of projecting units 110 is disposed to radiate lights at a constant angle with respect to a normal line of the measurement board 120. In addition, the plurality of projecting units 110 is arranged symmetrical to the normal line.

The plurality of projecting units 110 radiates a grid-patterned light toward the measurement object A. To this end, each of the plurality of projecting units 110 includes a light source 111, a grid unit 112 passing the light radiated from the light source 111 and a projecting lens part 113 imaging the grid-patterned light of the grid unit 112 on the measurement object A.

The light passing through the grid unit 112 forms the grid-patterned light. To this end, the grid unit 112 includes a blocking portion (not shown) and a passing portion (not shown). The blocking portion blocks the light radiated from the light source 111, and the passing portion passes the light. The grid unit 112 may be formed in a various form. The grid unit 112 will be described later.

The projecting lens part 113 may be formed, for example, by combination of a plurality of lenses, and focuses the grid-patterned light formed by passing through the grid unit 112 to image the grid-patterned light on the measurement object A disposed over the measurement board 120.

The imaging unit 150 receives a grid image reflected by the measurement object A. The imaging unit 150 includes, for example, a camera 151 and a receiving lens part 152. The grid image reflected by the measurement object A is captured by the camera 151 via the receiving lens part 152.

The control unit 140 may include an operation control unit 14 and a shape detecting section 142. The control unit 140 controls the work-stage 130, the projecting unit 110 and the imaging unit 150, and the shape detecting section 142 grasps the shape of the measurement object A located at the measurement board 120. In addition, in case that there exists data information capable of knowing the shape of the measurement object A of the measurement board 120 in advance, the data information may be used without grasping the shape of the measurement object A.

The control unit 140 may select and turn on even numbered projecting units 110, and the turned on even numbered projecting units 110 may be symmetrical with respect to the measurement object. When capturing the grid image at only one side, since an area, in which the grid image is not radiated at the other side of the measurement object A, is formed due to the measurement object A having a protruded three dimensional shape, an accurate three dimensional shape is not measured. Thus, the three dimensional shape may be more accurately measured by measuring the shape at the opposite side again.

For example, the control unit 140, in case that the measurement object A grasped by the shape detecting section 142 has a quadrangular shape, two projecting units 110 may be turned on, and in case that the measurement object A grasped by the shape detecting section 142 has an elliptic shape, more than or equal to 50% of the plurality of projecting units 110 may be turned on.

According to the apparatus for measuring a three dimensional shape 100 of the present embodiment, the plurality of projecting units 110 is disposed at locations symmetrical to each other, and thus time required for measurement may be reduced to increase inspection efficiency in comparison with a conventional apparatus for measuring a three dimensional shape, in which a projecting unit is moved and captures a grid image at an opposite side.

FIG. 6 is a schematic plan view illustrating an exemplary embodiment of the apparatus for measuring a three dimensional shape shown in FIG. 5. FIG. 7 is a schematic plan view illustrating another exemplary embodiment of the apparatus for measuring a three dimensional shape shown in FIG. 5.

Referring FIGS. 5, 6 and 7, the projecting units 110 are arranged in an equilateral polygon form. For example, the projecting units 110 may be arranged in a square form (FIG. 2), a regular hexagon (FIG. 3), etc.

In the present embodiment, the grid unit 112 shown in FIG. 5 may employ a liquid crystal display panel 112*a*. In case that the grid-patterned light is formed by using the liquid crystal display panel 112*a*, a graphic card (not shown) controlling a grid picture of the liquid crystal display panel 112*a* and a power supply part (not shown) providing the liquid crystal display panel 112*a* with a power source may be further provided. In case of using the liquid crystal display panel, an actuator for transferring a grid may not be necessary in comparison with using a real grid.

FIGS. 8 and 9 is a plan view illustrating an operation of a liquid crystal display panel forming a grid unit shown in FIG. 6 or FIG. 7.

Referring to FIG. 8, a blocking portion 401 and a passing portion 402 are displayed on the liquid crystal display panel 102. The blocking portion 401 blocks a light, and the passing portion 402 passes a light, thereby projecting the grid-patterned light to the measurement object A.

In order to precisely measure a three dimensional shape, the grid-patterned light is transferred by a value that is obtained by equally dividing a pitch P by n and projected to the measurement object A (In FIG. 9, for example, the blocking portion 401 and the passing portion 402 are transferred by 4-bucket, i.e., by a value equally divided as ¼ of the pitch P).

Accordingly, an actuator for transferring a grid may not be provided in the projecting unit.

FIG. 10 is a schematic plan view illustrating still another exemplary embodiment of the apparatus for measuring a three dimensional shape shown in FIG. 5. FIG. 11 is a schematic plan view illustrating still another exemplary embodiment of the apparatus for measuring a three dimensional shape shown in FIG. 5. The apparatus for measuring a three dimensional shape shown in FIGS. 10 and 11 is substantially the same as the apparatus for measuring a three dimensional shape shown in FIGS. 6 and 7 except that the grid unit formed at the projecting unit employs a grid 112*b* instead of the liquid crystal display panel 112*a*, and further includes an actuator 601 for operating the grid 112*b*. Thus, the same reference numerals are indicated to the same or similar elements, and any further description will be omitted.

Referring to FIGS. 10 and 11, an apparatus for measuring a three dimensional shape according to an exemplary embodiment of the present invention employs a grid 112*b*, which is different from the apparatus for measuring a three dimensional shape having the grid unit 112 using the liquid crystal display panel 112*a* in FIG. 6 or 7. The grid 112*b* may be formed, for example, by printing a grid pattern on a glass plate to form a blocking portion and a passing portion. Two grids may be formed together on the glass plate and used in adjacent projecting units.

As described above, in case of employing the grid 112*b*, an actuator 601 is formed to finely transfer the grid 112*b*.

The apparatus for measuring a three dimensional shape according to the present embodiment includes a plurality of projecting units arranged at vertices of an equilateral polygon, and the grids 112*b* formed at two adjacent projecting units is transferred by one actuator 601. The actuator 601 may employ a PZT.

When adjacent projecting units of the plurality of projecting units are sequentially operated, operation directions of the actuator 601 may preferably be opposite. More particularly, after a grid 112*b* ① is moved in an arrow a direction and the grid-patterned lights are projected to the measurement object A, a grid 112*b* ② of adjacent projecting unit is moved in an arrow b direction and the grid-patterned lights are projected.

More particularly, the grid-patterned light is radiated to the measurement object A via the grid 112*b* ①, and the imaging unit receives the grid image reflected by the measurement object by selected times (for example, four times). Then, the grid-patterned light is radiated to the measurement object A via the grid 112*b* ②, the imaging unit receives the grid image reflected by the measurement object by selected times (for example, four times). Likewise, a grid ③ and a grid ④ are performed the same. The control unit calculates an accurate three dimensional shape of the measurement object, in which a shadow region (an area at which the grid-patterned light at a side of the measurement object does not arrive when the grid-patterned light is projected at an opposite side of the measurement object, because the measurement object has a three dimensional shape) is compensated by using the received 16 grid images in total. For example, shadow regions ① and ② are compensated by using values of grid image ① and ③, and values of shadow regions ② and ④ are compensated by using values of grid images ② and ④. The values of shadow regions are replaced by values corresponding to opposite areas to be compensated.

The actuator 601 employed in the apparatus for measuring a three dimensional shape according to the present embodiment simultaneously operates the grids 112*b* formed at the two adjacent projecting units. Thus, the number of the actuators 601 may be reduced to a half of the number of the projecting units.

Also, since a transfer direction of the actuator 601 contrarily operates direction of the grid 112*b* when the adjacent projecting units are sequentially operated, time required for operation may be reduced.

Embodiment 3

FIG. 12 is a schematic view illustrating an apparatus for measuring a three dimensional shape according to Embodiment 3 of the present invention. FIG. 13 is a plan view illustrating the apparatus for measuring a three dimensional shape shown in FIG. 12.

Referring to FIGS. 12 and 13, an apparatus for measuring a three dimensional shape 300 according to the present embodiment includes a stage 320 supporting a measurement object 310, at least one lighting unit 330, a plurality of image pickup units 340 and a control unit 350.

The stage 320 supports the measurement object 310, and moves in an x-axis and a y-axis according to control of the control unit 350 to transfer the measurement object 310 to a measurement location.

The lighting unit 330 radiates a grid-patterned light 410 to the measurement object 310 fixed to the stage 320. The lighting unit 330 is disposed inclined with respect to a reference surface of the stage 320 by a constant angle. The apparatus for measuring a three dimensional shape 300 may include a plurality of lighting units 330 to increase measurement precision. For example, the apparatus for measuring a three dimensional shape 300 may include four lighting units 330 as shown in FIG. 13. The lighting units 330 are spaced apart from each other along a circumferential direction around the main image pickup portion that is disposed perpendicular to the reference surface of the stage 320. Especially, the lighting units 330 may be disposed symmetrical with respect to the normal line of the reference surface of the stage 320. Thus, the plurality of lighting units 330 radiates the grid-patterned light 410 in different directions with respect to the measurement object 310 at a constant time interval. The apparatus for measuring a three dimensional shape 300 may have the various numbers of lighting units 330, such as 2, 3, 6, etc.

Each lighting unit 330 includes a light source 332 and a grid 334. In addition, each lighting unit 330 may further include a grid transfer instrument 336 and a projecting lens part 338.

The light source 332 radiates a light toward the measurement object 310. The grid 334 converts the light radiated from the light source 332 into the grid-patterned light 410 according to grid pattern. The grid 334 is transferred by a grid transfer instrument 336 such as a piezoelectric actuator (PZT), etc. by 2 n/n per one time and n times so as to generate the phase-transited grid-patterned light 410. The 'n' is a natural number greater than or equal to 2. The projecting lens part 338 projects the grid-patterned light 410 generated by the grid 334 to the measurement object 310. The projecting lens part 338 may be formed, for example, by combination of a plurality of lenses, and focuses the grid-patterned light 410 formed via the grid 334 to project the grid-patterned light 410 to measurement object 310. Thus, each lighting unit 330 transfers the grid 334 by n times, and the grid-patterned light 410 is radiated to the measurement object 310 at each transfer.

The apparatus for measuring a three dimensional shape 300 according to the present embodiment includes a plurality of image pickup units 340 to capture the grid image 420 formed by the grid-patterned light 410, which is radiated from the lighting unit 330, reflected from the measurement object 310 in different directions.

Particularly, the apparatus for measuring a three dimensional shape 300 includes a main image pickup portion 340*a* disposed over the stage 320 and vertical with respect to the reference surface of the stage 320, and a plurality of sub image pickup portions 340*b* disposed inclined with respect to the reference surface of the stage 320 by a constant angle. For example, the apparatus for measuring a three dimensional shape 300 may include four sub image pickup portions 340*b* as shown in FIG. 13. The sub image pickup portions 340*b* are spaced apart from each other along a circumferential direction around the main image pickup portion 340*a*. Especially, the sub image pickup portions 340*b* may be disposed symmetrical with respect to the normal line of the reference surface of the stage 320. Thus, the main image pickup portion 340*a* and the sub image pickup portions 340*b* simultaneously capture the grid image 420 reflected from the measurement object 310 in different directions according to operation of each lighting unit 330. The apparatus for measuring a three dimensional shape 300 may include the various numbers of sub image pickup portions 340*b* such as 2, 3, 6, etc.

Each of the main image pickup portion 340*a* and the sub image pickup portions 340*b* may include a camera 342 and an imaging lens part 344 for capturing the grid image 420. The camera 342 may employ a CCD camera or a CMOS camera. Thus, the grid image 420 reflected from the measurement object 310 is imaged by the imaging lens part 344 and captured by the camera 342.

The lighting units 330 and the sub image pickup portions 340b may be on the same concentric circle around the main image pickup portion 340a. Alternatively, the lighting units 330 may be on a concentric circle different from the sub image pickup portions 340b. In addition, the lighting units 330 may be installed at a height different from or at the same height as the sub image pickup portions 340b. Each of the lighting units 330 may be disposed between the sub image pickup portions 340b. Alternatively, when the lighting units 330 is installed at a height different from the sub image pickup portions 340b, the lighting units 330 may be installed at the same location as the sub image pickup portions 340b.

The control unit 350 generally controls operations of the elements included in the apparatus for measuring a three dimensional shape 300. The control unit 350 controls transfer of the stage 320 to locate the measurement object 310 to the measurement location. The control unit 350 sequentially operates the plurality of lighting units 330. The control unit 350 transfers the grid 334 of each lighting unit 330 by n times, and controls the lighting unit 330 to radiate the grid-patterned light 410 to the measurement object 310 at each transfer. The control unit 350 controls the plurality of image pickup units 340 to simultaneously capture the grid image 420 reflected from the measurement object 310.

The control unit 350 calculates the three dimensional shape of the measurement object 310 by using the grid images 420 captured by the main image pickup portion 340a and the sub image pickup portions 340b. For example, the control unit 350 matches coordinate systems of the grid images 420 captured by the main image pickup portion 340a and the sub image pickup portions 340b. In addition, the control unit 350 calculates a reliability index (visibility) for each grid image 420 by using n values measured using an n-bucket algorithm in each of the main image pickup portion 340a and the sub image pickup portions 340b, from mathematical equations 1 and 2 as follows, and applies a weight to the calculated 5 reliability indices, to map weight-applied data and calculate final measurement value.

$$I_0 = \frac{I_1 + I_2 + I_3 + I_4}{4}$$ Mathematical Equation 1

$$V = \frac{\sqrt{(I_4 - I_2)^2 + (I_1 - I_3)^2}}{2I_0}$$ Mathematical Equation 2

In mathematical equations 1 and 2, $I_1$, $I_2$, $I_3$, and $I_4$ indicate intensities of the grid images measured by 4 times through a 4-bucket algorithm in each image pickup unit, for one point, and V indicates a reliability index of the grid image measured in each image pickup unit, which is calculated by using them.

The control unit 350 may calculate the three dimensional shape of the measurement object 310 by using only grid images 420 measured in the main image pickup portion 340a and one or two sub image pickup portions 340b adjacent to lighting unit 330 under operation.

FIG. 14 is an enlarged view, in which a measurement object is enlarged so as to explain a process of measuring a three dimensional shape of a measurement object shown in FIG. 12.

Referring to FIGS. 12 and 14, the measurement object 310 may include a circuit board 312 and an electronic element 316 on the circuit board 312, which are coupled by a solder 314.

The grid-patterned light 410 is radiated from the lighting unit 330, and reflected from the measurement object 310 to generate the grid image 420. Since the solder 314 connecting the electronic element 316 to the circuit board 312 has a characteristic of a mirror surface, a regular reflection occurs at the solder 314. Thus, the grid image 420 reflected from a part area out of an area of the solder 314 is upwardly reflected and enters the main image pickup portion 340a, but the grid image 420 reflected from a remaining part area is reflected to be inclined by a predetermined angle and does not enter the main image pickup portion 340a. Instead, the grid image 420 reflected from the measurement object 310 to be inclined by the predetermined angle is captured by the sub image pickup portion 340b. In other words, a main image that is upwardly reflected, out of the grid image 420 by the grid-patterned light 410 reflected from the measurement object 310, is captured by the main image pickup portion 340a, and a sub image that is regularly reflected to be inclined by the predetermined angle and does not enter the main image pickup portion 340a, out of the grid image 420 by the grid-patterned light 410 reflected from the measurement object 310, is captured by the at least one sub image pickup portion 340b. Thus, the main image captured by the main image pickup portion 340a and the sub image captured by the sub image pickup portion 340b are properly combined to precisely measure the total three dimensional shape of the measurement object 310 including the area of the solder 314.

FIG. 15 is a flow chart illustrating a method for measuring a three dimensional shape according to Embodiment 3 of the present invention.

Referring to FIGS. 12 and 15, in order to measure the three dimensional shape of the measurement object 310, the control unit 350 transfers the stage 320 to transfer the measurement object 310 to the measurement location in step S100.

After the measurement object 310 is located to the measurement location, the grid-patterned light 410 is radiated to the measurement object 310 by the at least one lighting unit 330 in step S200. For example, the plurality of lighting units 330 inclined by a constant angle with respect to the reference surface of the stage 320 and spaced apart from each other along a circumferential direction around the main image pickup portion 340a is sequentially operated to sequentially radiate the grid-patterned light 410. Each lighting unit 330 radiates the grid-patterned light 410 to the measurement object 310 at each transfer while transferring the grid 334 by n times.

After the grid-patterned light 41O is radiated to the measurement object 310, the grid image 420 reflected from the measurement object 31O is captured in different directions by the plurality of image pickup units 340 in step S300. Particularly, the main image that is toward an upper direction out of the grid image 420 reflected from the measurement object 310 is captured by the main image pickup portion 340a disposed perpendicular to the reference surface of the stage 320. At the same time, the sub image that is regularly reflected from the measurement object 310 to be inclined by the predetermined angle and does not enter the main image pickup portion 340a, out of the grid image 420 reflected from the measurement object 310 is captured by sub image pickup portions 340b disposed inclined with respect to the reference surface of the stage 320 by a constant angle, and spaced apart from each other along a circumferential direction around the main image pickup portion 340a.

Thereafter, the control unit 350 matches coordinate systems of the main image and the sub images captured by the main image pickup portion 340a and the sub image pickup portions 340b in step S400. In other words, since there occurs a path difference when the grid image 420 reflected from the measurement object 310 arrives at the main image pickup portion 340a and the sub image pickup portions 340b, the path difference incurs difference between the grid images 420 captured by the main image pickup portion 340a and the sub image pickup portions 340b. Thus, the difference between grid images 420 due to the path difference is compensated to make coordinate systems of the main image and the sub images coincident with each other.

Then, the control unit 350 maps the main image and the sub images based on the reliability index (visibility) of each of the main image and the sub images that are matched, to calculate the three dimensional shape of the measurement object 310 in step S500. For example, the control unit 350 calculates the reliability index (visibility) of each of the main image and the sub images by using the above mathematical equations 1 and 2, and applies a weight to the calculated 5 reliability indices, to calculate the three dimensional shape of the measurement area of the measurement object 310 by using the weight-applied data. For example, reliability of the final measurement value may be enhanced by applying an image over a specific value among the calculated 5 reliability indices to a great weight, and applying an image below a specific value among the calculated 5 reliability indices to a low weight or to be excluded.

As described above, a process of capturing the grid image 420 by the main image pickup portion 340a and the sub image pickup portions 340b is repetitively performed whenever the lighting unit 330 radiates the grid-patterned light 410, and the control unit 350 finally measures the three dimensional shape of the measurement object 310 by using the images obtained from the repetitive capture.

As described above, together with the main image pickup portion 340a for capturing the main image out of the grid image 420 reflected from the measurement object 310, the sub image pickup portions 340b are additionally installed for capturing the sub image that is regularly reflected from the measurement object 310 and is not captured by the main image pickup portion 340a, to more precisely measure the three dimensional shape of the measurement object 310.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

An apparatus and a method for measuring a three dimensional shape of the present invention may be applied to a field of measuring a three dimensional shape of a measurement object such as a printed circuit board, a solder, etc.

The invention claimed is:

1. An apparatus for measuring a three dimensional shape, comprising:
a projecting unit above an inspection object placed on a table, configured to radiate a first light in a grid pattern to the inspection object, wherein an intensity of the first light in the grid pattern is uniform along a direction of the grid pattern;
a plurality of imaging units configured to capture grid images generated from the first light reflected off of the inspection object, the plurality of imaging units being arranged in a plurality of different directions to capture the grid images including different sides of the inspection object; and
a control unit configured to operate the plurality of imaging units such that the plurality of imaging units capture the grid images simultaneously and to calculate the three dimensional shape of the inspection object based on the grid images captured by the plurality of imaging units,
wherein each of the plurality of imaging units is arranged to be oblique to the direction of the grid pattern on a plane of the table in a plan view of the table.

2. The apparatus of claim 1, further comprising at least one lamp unit configured to radiate a second light to the inspection object,
wherein the plurality of imaging units are further configured to capture light images generated from the second light reflected off of the inspection object, and
wherein the control unit is further configured to calculate the three dimensional shape of the inspection object based on the grid images and the light images.

3. The apparatus of claim 1, further comprising:
at least one lamp unit configured to radiate a second light to the inspection object;
an additional imaging unit configured to capture a light image generated from the second light reflected off of the inspection object; and
a beam splitting unit installed under the projecting unit to (1) pass the first light in the grid pattern and (2) receive and pass the light image for the additional imaging unit reflected from the inspection object.

4. The apparatus of claim 1, wherein the number of the plurality of the imaging units is four, and
wherein two imaging units in each of two pairs of the imaging units are arranged oppositely with the inspection object at a center of the two imaging units.

5. The apparatus of claim 1, wherein the plurality of imaging units are arranged to be on a same concentric circle with the inspection object at a center of the plurality of imaging units.

6. The apparatus of claim 1, wherein the control unit is further configured to match coordinate systems of the grid images to calculate the three dimensional shape of the inspection object.

7. The apparatus of claim 1, wherein the control unit is further configured to:
calculate a reliability index of each of the grid images,
apply a weight to the reliability index, and
calculate the three dimensional shape of the inspection object based on the weight-applied reliability index.

8. The apparatus of claim 1, wherein the first light in the grid pattern is oblique with respect to Y-axis direction of an X-Y plane of the table.

9. The apparatus of claim 1, wherein the inspection object has a quadrangular shape, and
wherein the grid pattern on the inspection object is oblique to edges of the inspection object.

10. The apparatus of claim 1, wherein a liquid crystal display panel is used to form the grid pattern.

11. An apparatus for measuring a three dimensional shape, comprising:
a projecting unit above an inspection object placed on a table, configured to radiate a first light in a grid pattern to the inspection object, wherein an intensity of the first light in the grid pattern is uniform along a direction of the grid pattern;

a plurality of imaging units configured to capture grid images generated from the first light reflected off of the inspection object, the plurality of imaging units being arranged in a plurality of different directions to capture the grid images including different sides of the inspection object; and a control unit configured to operate the plurality of imaging units such that the plurality of imaging units capture the grid images simultaneously and to calculate the three dimensional shape of the inspection object based on the grid images captured by the plurality of imaging units, wherein each of the plurality of imaging units is arranged to be oblique to the direction of the grid pattern on a plane of the table in a plan view of the table and wherein the projecting unit is further configured to radiate the first light to the inspection object perpendicularly to the table.

12. The apparatus of claim 11, further comprising at least one lamp unit configured to radiate a second light to the inspection object, wherein the plurality of imaging units are further configured to capture light images generated from the second light reflected off of the inspection object, and wherein the control unit is further configured to calculate the three dimensional shape of the inspection object based on the grid images and the light images.

13. The apparatus of claim 11, further comprising:

at least one lamp unit configured to radiate a second light to the inspection object;

an additional imaging unit configured to capture a light image generated from the second light reflected off of the inspection object; and a beam splitting unit installed under the projecting unit to (1) pass the first light in the grid pattern and (2) receive and pass the light image for the additional imaging unit reflected from the inspection object.

14. The apparatus of claim 11, wherein the number of the plurality of the imaging units is four, and wherein two imaging units in each of two pairs of the imaging units are arranged oppositely with the inspection object at a center of the two imaging units.

15. The apparatus of claim 11, wherein the plurality of imaging units are arranged to be on a same concentric circle with the inspection object at a center of the plurality of imaging units.

16. The apparatus of claim 11, wherein the control unit is further configured to match coordinate systems of the grid images to calculate the three dimensional shape of the inspection object.

17. The apparatus of claim 11, wherein the control unit is further configured to:

calculate a reliability index of each of the grid images, apply a weight to the reliability index, and calculate the three dimensional shape of the inspection object based on the weight-applied reliability index.

18. The apparatus of claim 11, wherein the first light in the grid pattern is oblique with respect to Y-axis direction of an X-Y plane of the table.

19. The apparatus of claim 11, wherein the inspection object has a quadrangular shape, and wherein the grid pattern on the inspection object is oblique to edges of the inspection object.

20. The apparatus of claim 11, wherein a liquid crystal display panel is used to form the grid pattern.

* * * * *